United States Patent
Kolam

(10) Patent No.: US 9,401,949 B1
(45) Date of Patent: Jul. 26, 2016

(54) CLIENT WEB CONTENT CACHE PURGE

(71) Applicant: Instart Logic, Inc., Palo Alto, CA (US)

(72) Inventor: Hariharan Kolam, Palo Alto, CA (US)

(73) Assignee: Instart Logic, Inc., Palo Alto, CA (US)

( * ) Notice: Subject to any disclaimer, the term of this patent is extended or adjusted under 35 U.S.C. 154(b) by 0 days.

(21) Appl. No.: 14/550,165

(22) Filed: Nov. 21, 2014

(51) Int. Cl.
*G06F 15/173* (2006.01)
*H04L 29/08* (2006.01)
*H04L 12/26* (2006.01)

(52) U.S. Cl.
CPC ............... *H04L 67/02* (2013.01); *H04L 43/06* (2013.01); *H04L 67/1095* (2013.01); *H04L 67/2842* (2013.01)

(58) Field of Classification Search
CPC ... H04L 29/06; H04L 29/08072; H04L 67/00; G06F 15/16
USPC .......................................................... 709/224
See application file for complete search history.

(56) References Cited

U.S. PATENT DOCUMENTS

| | | | |
|---|---|---|---|
| 7,117,504 B2 * | 10/2006 | Smith | G06F 8/20 709/201 |
| 7,711,570 B2 * | 5/2010 | Galanes | G06F 9/4443 704/270 |
| 8,224,650 B2 * | 7/2012 | Galanes | H04M 1/72561 704/270.1 |
| 2003/0187918 A1 * | 10/2003 | Burbeck | H04L 29/12009 709/203 |
| 2004/0230434 A1 * | 11/2004 | Galanes | H04M 3/42204 704/270.1 |
| 2004/0230637 A1 * | 11/2004 | Lecoueche | G10L 15/20 709/200 |
| 2005/0091059 A1 * | 4/2005 | Lecoeuche | H04M 1/72561 704/270.1 |
| 2005/0240943 A1 * | 10/2005 | Smith | G06F 9/465 719/328 |
| 2009/0100154 A1 * | 4/2009 | Stevenson | G06Q 30/02 709/220 |
| 2010/0161717 A1 * | 6/2010 | Albrecht | H04L 67/2852 709/203 |
| 2010/0250706 A1 * | 9/2010 | Burckart | H04L 67/02 709/219 |
| 2011/0055329 A1 * | 3/2011 | Abt et al. | 709/205 |
| 2012/0096106 A1 * | 4/2012 | Blumofe et al. | 709/213 |
| 2015/0046915 A1 * | 2/2015 | Oliver et al. | 717/170 |

* cited by examiner

*Primary Examiner* — Tauqir Hussain
(74) *Attorney, Agent, or Firm* — Van Pelt, Yi & James LLP

(57) ABSTRACT

Tracking web content updates is disclosed. An indication that a web content has been updated is received. It is tracked that the web content has been updated. An update to a client that a version of the web content stored in a web browser cache of the client is no longer valid is provided.

20 Claims, 10 Drawing Sheets

```
<html>
   <head>
      <title>Welcome</title>
   </head>
   <body>
      <h1>HelloWorld </h1>
              .
              .
              .
      <img src = "url for image"/>
      <video>
         <source src = "url for video" type = "video/ogg"  />
      </video>
      <script type = "text/javascript">
      <!--script
      *** Some javascript code is placed here ***
      -->
      </script>
   </body>
</html>
```

200

Script

FIG. 2

CLIENT WEB CONTENT CACHE PURGE

BACKGROUND OF THE INVENTION

Web browsers often cache content to allow faster rendering of a desired web content that has been previously received. However, dynamic content is often difficult to cache because the dynamic content may change at any time. Consequently, dynamic content is often not cached or cached for a very short amount of time. Therefore, there exists a need for a way to more efficiently cache web content.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

DETAILED DESCRIPTION

Figure 1:
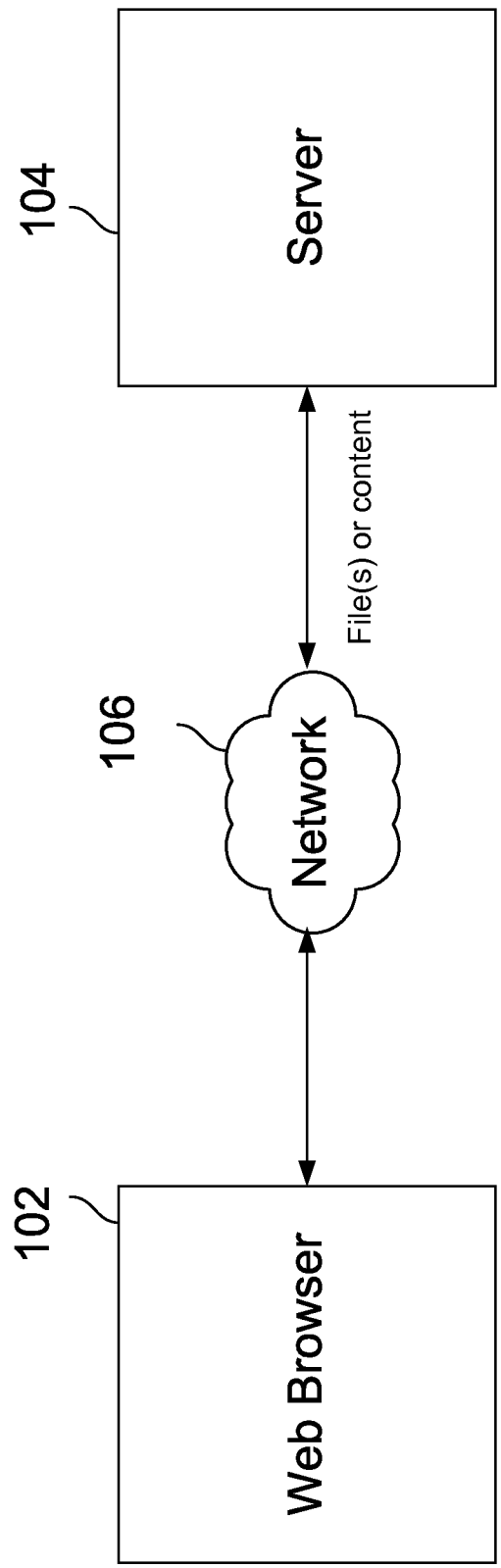
FIG. 1 is a block diagram illustrating an embodiment of a web browser accessing webpages and other information through a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a request for web content is received. For example, a rendering client such as a web browser initiates a request to obtain contents of a desired webpage and/or a content resource to be rendered. An indication received from a server is used to determine whether a current version of the web content has been cached at a web browser cache of a client system. For example, a current version identifier of the requested web content has been received from the server and it is determined whether the most current version as indicated by the version identifier is cached in a cache of the web browser. In the event the current version of the web content has not been cached, the current version of the web content is requested via a network. For example, a previous version of the web content is not utilized if it is not the latest indicated version. In the event the current version of the web content has been cached, the cached web content is utilized. Examples of the web content include a webpage, a streaming content, a web application, a web resource, a resource of a webpage, and any other content accessible via the Internet.

FIG. 1 is a block diagram illustrating an embodiment of a web browser accessing webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript, JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components and resources of the webpage in a local memory.

The Document Object Model (DOM) is a standardized model supported by different web browsers, e.g., Internet Explorer, Firefox, and Google Chrome, to represent the various components of a webpage. The DOM is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard includes different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document.

The DOM standard represents documents as a hierarchy of node objects, called a DOM tree. Some types of nodes may have child nodes of various types, and others are leaf nodes that cannot have any object below them in the document structure hierarchy.

Figure 3:
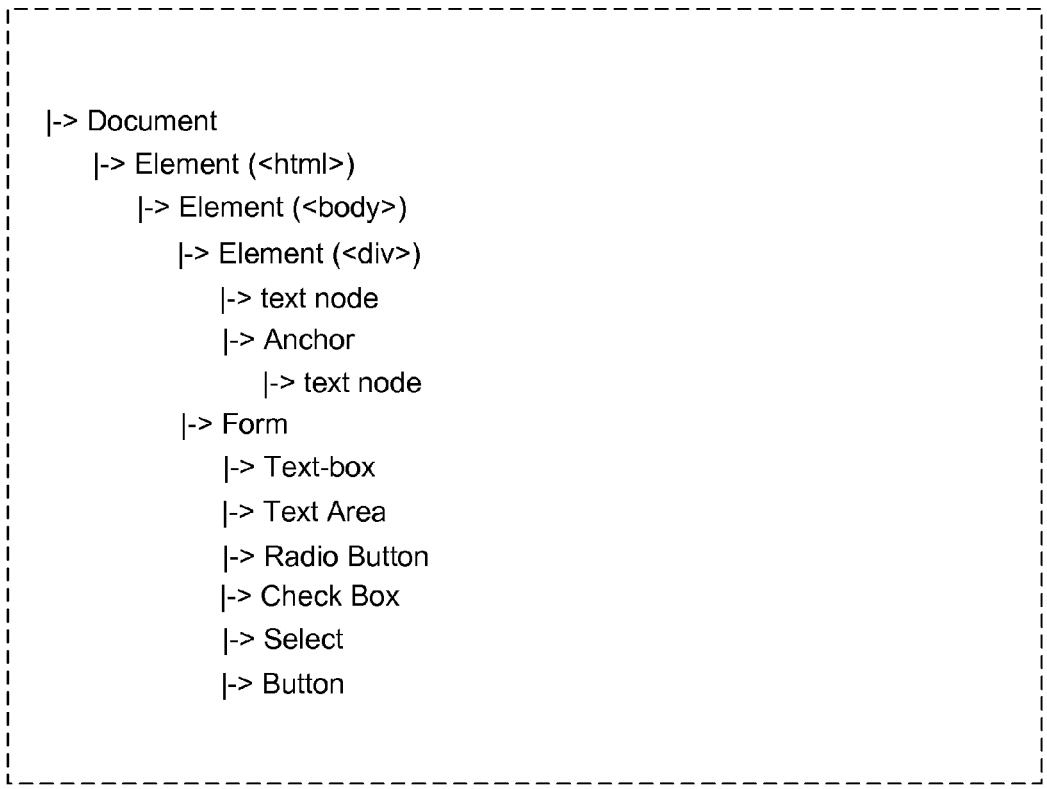
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components and resources of webpage 200 in a local memory. For example, when the image tag (shown as <img src="url for image"/> in FIG. 2) is parsed by web browser 102, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 200 redirects web browser 102 to fetch an image file from a uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by Javascript. In response to the request, the requested dependent resource is sent to web browser 102 via a network.

For example, if the nodes of the DOM tree include N different links and/or URLs, N separate GET requests (e.g., N separate HTTP GET requests) are sent via a network requesting the dependent resources to be sent to web browser 102. In response, N separate GET responses (e.g., N separate HTTP GET responses) are sent to web browser 102, delivering the dependent resources to web browser 102.

The round trip time or network response time for a GET request to arrive at an edge server and for its corresponding GET response to arrive at web browser 102 is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the network may vary depending on its network type(s).

Some networks have relatively lower network latency. For example, the network latency associated with WANs or Wi-Fi networks is relatively low, e.g., on the order of 10 milliseconds. Suppose the number of links and/or URLs included in the DOM tree, N, is equal to twenty. The total network latency associated with receiving the dependent resources associated with the twenty links and/or URLs from the edge server, then, is approximately 200 milliseconds. To improve network performance, present day browsers have become more efficient in reusing connections to the same server, such that typically less than 20% of the connections may be fresh connections.

Some networks have relatively higher network latency. For example, the network latency associated with a $3^{rd}$ generation mobile telecommunications (3G) network is relatively high, e.g., on the order of 100 milliseconds. In this instance, the total network latency associated with receiving the dependent resources associated with the twenty links and/or URLs from the edge server is then on the order of two seconds.

Since the network latency associated with different types of networks varies widely, and web browser 102 needs to receive the dependent resources associated with the links and URLs before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks. Therefore, improved techniques for delivering information corresponding to a webpage would be desirable.

Figure 4:
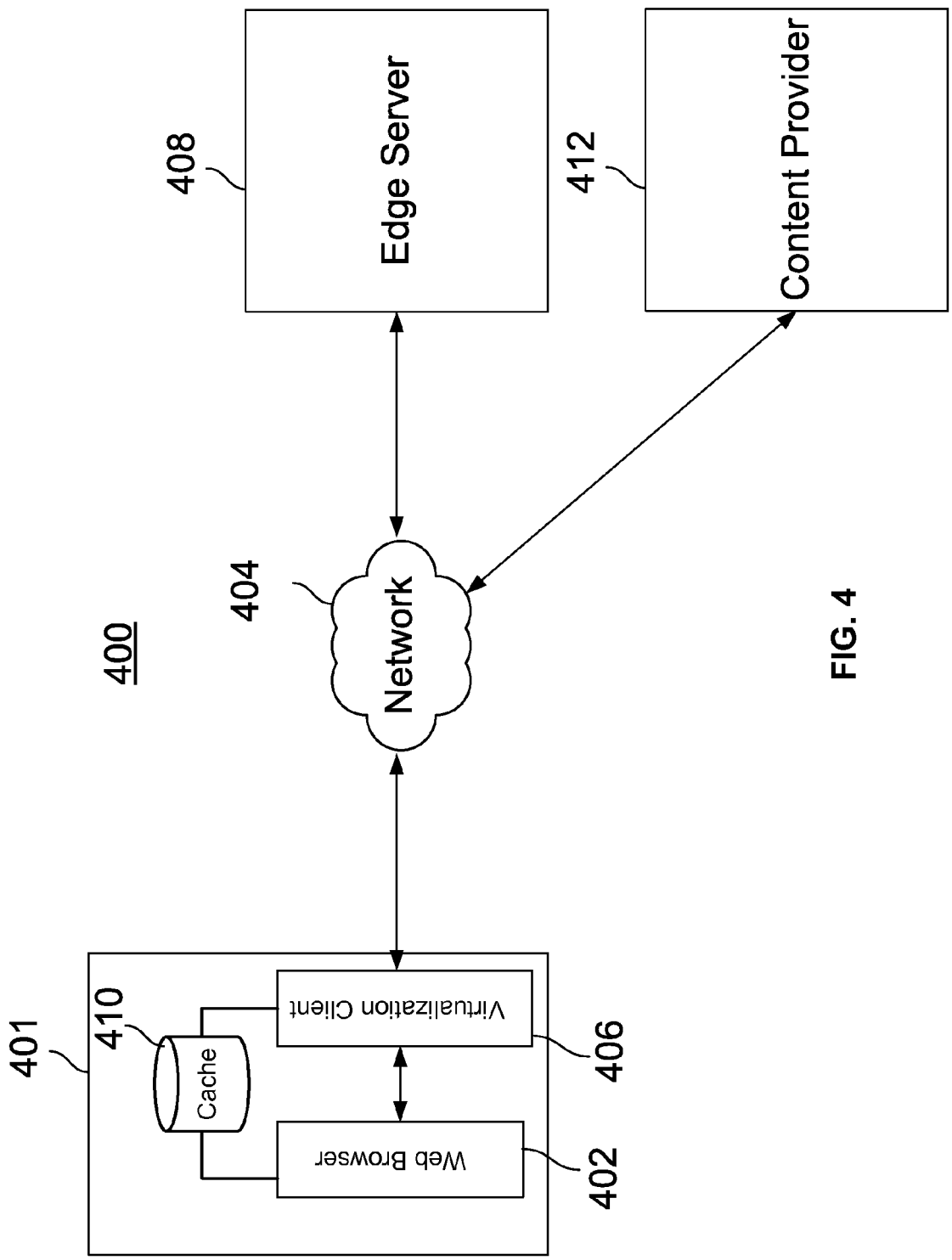
FIG. 4 is a block diagram illustrating an embodiment of an optimized content delivery environment.

FIG. 4 is a block diagram illustrating an embodiment of an optimized content delivery environment. Client-server system 400 may be utilized to modify and/or virtualize a DOM of a web browser. Virtualization of a DOM of a web browser may allow the client-server system to take control of the DOM for different kinds of optimizations, while keeping the virtualization transparent to the web browser. Client device 401 includes web browser 402, virtualization client 406, and cache 410. For example, an end-user may utilize client device 401 to access desired network/Internet content. Examples of client device 401 include a desktop computer, a laptop computer, a personal computer, a mobile device, a tablet computer, a smartphone, a wearable computer, and any other computing device.

One or more of the following may be included in network 404: a direct or indirect physical communication connection, mobile communication network, Internet, intranet, Local Area Network, Wide Area Network, Storage Area Network, a wireless network, a cellular network, PTSN, and any other form of connecting two or more systems, communication devices, components, or storage devices together. Although example instances of components have been shown to simplify the diagram, additional instances of any of the components shown in FIG. 4 may exist. Components not shown in FIG. 4 may also exist.

A web browser 402 accesses webpages and other information through a network 404. When web browser 402 sends network messages onto network 404 that are related to the downloading of webpages or other information and resources, the messages may be (1) intercepted and processed by virtualization client 406, (2) directly received and then processed by edge server 408, or (3) provided directly to a content provider such as content provider 412.

In some embodiments, when web browser 402 requests a webpage, the request is provided to edge server 408 and/or origin content provider 412. Rather than providing the full HTML file of the original requested webpage, the web browser is provided an alternative webpage file of the original webpage that includes virtualization client 406 but not the complete contents of the requested webpage (e.g., HTML file) that would be provided in a traditional response. When web browser 402 attempts to render the alternative webpage, virtualization client 406 is executed. In some embodiments, virtualization client 406 initiates a different request for the actual contents of the desired webpage and receives the original desired webpage. This webpage may be modified by the virtualization client 406 as desired before rendering the desired webpage using web browser 402. Thus by utilizing the alternative webpage that utilizes virtualization client 406 to fetch and modify the desired webpage, the desired webpage is able to be modified before the desired webpage is rendered by web browser 402. In some embodiments, modifying the desired webpage includes creating a modified document object model structure different from the document object model structure corresponding to the received desired webpage.

In some embodiments, webpages or other information and resources related to the webpages that are sent to web browser 402 may be intercepted, filtered, processed, or provided by vitalization client 406 or edge server 408 (e.g., content from content provider 412 for web browser 402 is routed via virtualization client 406 and/or edge server 408). In addition, method API calls by web browser 402 or any JavaScript code to manipulate the objects in a DOM tree may be intercepted, processed, or modified by virtualization client 406. Virtualization client 406 may also manipulate the DOM tree by making the appropriate method API calls to the DOM tree. In some embodiments, virtualization client 406 and edge server 408 together create a virtualization engine for the DOM of web browser 402. The virtualization engine may access and manipulate a DOM tree, including the creation, deletion, or update of nodes within the DOM tree.

In various embodiments, modifying the original webpage by creating a modified document object model structure different from the document object model structure corresponding to (e.g., specified by) the received desired webpage may be applicable to different types of optimizations. In some embodiments, content redirection may be achieved by replacing a location address of a webpage resource with another location address that is able to provide the resource more efficiently. In some embodiments, optimized delivery of information over a network by segmentation and reprioritization of downloaded information is achieved. For example, the delivery of the information (e.g., the order in which the information is delivered or the granularity of the information delivered) and the actual content of the delivered information corresponding to any nodes of the DOM tree structure may be altered, thereby speeding up the rendering of a webpage without compromising the end-user's experience.

In some embodiments, the virtualization and/or modification of the DOM structure is transparent (e.g., invisible) to web browser 402. In some embodiments, the virtualization and/or modification of the DOM structure is also transparent to the end-users. For example, the end-users are not required to install any plugins. In some embodiments, the virtualization of the DOM structure is also transparent to the content publishers, without requiring the content publishers to change any codes.

In some embodiments, virtualization client 406 may be injected into web browser 402 based on standards-based (e.g., HTML, JavaScript, ActionScript, etc.) procedures. For example, after edge server 408 receives a request from web browser 402 requesting an HTML webpage file, server 408 injects virtualization client 406 into an alternative HTML webpage file of the requested HTML file, and then sends the response back to web browser 402. In some embodiments, virtualization client 406 may be injected into web browser 402 by a content provider directly. For example, web browser 402 requests an HTML webpage file directly from content provider 412 and content provider 412 provides an alternative webpage file with code of injected virtualization client 406. Content provider 412 may be a content producer of the provided content. In some embodiments, virtualization client 406 may be injected by adding JavaScript client code in the head section of an alternative HTML webpage file. Examples of content provider 412 include an origin server and a node/server of a content delivery network.

In some embodiments, when an alternative webpage file is received by web browser 402, the received content includes a data mapping of one or more content locations (e.g., uniform resource identifier (URI)/uniform resource locator (URL), IP address, etc.) to corresponding translated content locations. For example, a table of translating initial URIs to translated URIs is received along with the corresponding initial webpage content and code of client 406. In some embodiments, virtualization client 406 requests the data mapping along with a request for contents of an original requested webpage. The table may be used to replace a URI of a resource (e.g., image, video, other referenced content, etc.) of the desired webpage to a different translated URI before the external resource is requested via network 404. In some embodiments, the original desired webpage content references one or more resources and the resources are to be obtained via network 404 (e.g., from edge server 408 or content provider 412). Virtualization client 406 may modify a target location address of a resource of the webpage with another location address using the received mapping data. For example, one or more initial content location addresses of resources specified by the intercepted request may be replaced with other location addresses that are (1) associated with a more efficient/faster server that is able to provide the resource and/or (2) associated with different resource(s) or different version(s) of the resource(s) that are to replace initially referenced resource(s). In some embodiments, a location address that references content provider 412 is to be replaced with a different location address that references edge server 408 instead. In some embodiments, in a response to a resource request, edge server 408 may provide an update to a data structure mapping of one or more initial target location addresses of resource requests to one or more corresponding translated target location addresses, provided along with the requested content. The update to the data structure may be specific to a webpage of the resource request.

In some embodiments, browser cache 410 stores content that can be utilized by browser 402 to render web content instead of obtaining the content via network 404. For example, if the desired content of browser 402 is locally stored in a cache of the machine running browser 402, it would be faster to obtain the content locally rather than via a network request. However, dynamic content is often difficult to cache at browser cache 410. For example, if content is known to change, the content may not be cached in cache 410 and/or associated with a very short time-to-live (TTL) time when the cached dynamic content may be utilized. In some embodiments, dynamic content is able to be cached at browser cache 410 by enabling identification of whether the most current version of the dynamic content is cached. For example, a current version identifier of requested web content is received from edge server 408 and virtualization client 406 requests the most current version as indicated by the version identifier to be utilized. In the event the current version of the web content has not been cached, the current version of the web content is requested via a network. For example, a previous cached version of the web content is not utilized if it is not the latest indicated version. In the event the current version of the web content has been cached, the cached web content is utilized. In some embodiments, virtualization client 406 requests the most current version, as indicated by the version identifier, to be utilized by modifying a request of content (e.g., add query string, modify URI, etc.) to specify the most current version as the requested version.

If browser cache 410 and/or a cache of edge server 408 is caching an old version of content that has been since modified/updated, the old version may be deleted and entire contents of the new version requested and received via content via network 404. However when dynamic content is updated, often only a portion of the dynamic content has been modified from a previous version of the dynamic content. In some embodiments, when edge server 408 receives an indication that web content has been updated, it determines the difference between the updated web content and a previous version of the web content. In some embodiments, when web browser 402 and/or virtualization client 406 requests the latest version of a previously cached content, the determined difference is provided by edge server 408 and virtualization client 406 produces the updated web content using the difference and a previous version of the updated web content. For example, rather than sending the entire updated web content, a smaller sized difference update is sent to allow virtualization client 406 to patch/update the previous version to generate the latest updated version.

In some embodiments, one or more resources of a webpage/web content desired to be rendered by browser 402 are preloaded in browser cache 410 prior to the original code of the webpage/web content requesting the resource. Thus when the preloaded content is needed/requested by the original code, the requested content is already in the cache for immediate use rather than requiring a request to be made via a network for the requested content. In some embodiments, one or more resources of a webpage/web content to be preloaded are requested in an optimized order. Obtaining resources in a requested order of the original code of the webpage/web content may not be optimal for rendering the webpage/web content as soon as possible. Often a web browser is limited by a limitation on a maximum number of concurrent connections to a single server. For example, web browser 402 is allowed to maintain up to four connections per server and when web browser 402 needs to obtain more than four resources from a single server, the additional requests for resources from the server must be queued. However, the ordering in which resources are requested affects the total amount of time required to obtain all the resources. In some embodiments, the ordering in which resources should be obtained is reordered and optimized based at least in part on one or more of the following: an order of resources requested in the webpage, an observed order of resources placed in a DOM, sizes of the resources, a maximum number of possible concurrent connections, a parameter/setting of the browser being utilized, a type of browser being utilized, visual importance of the resources, utilization frequencies of the resources, and other properties/information about the resources.

Using the virtualization client 406, optimized delivery of information over a network by segmentation and reprioritization of downloaded information may be achieved. Note that the delivery of different information to web browser 402 may be determined by the type of information. For example, dependent resources such as images, audio clips, and videos may be delivered using different techniques that are optimized based on the type of resource. In some embodiments, the virtualization client 406 may selectively alter or modify the delivery of only certain types of information (e.g., images). Images are used hereinafter as an example of the various dependent resources that can be efficiently downloaded to web browser 402 by the virtualization engine. Note that the examples of downloading images are selected for illustration purposes only; accordingly, the present application is not limited to these specific examples only.

In some other techniques, a compressed image is encoded in a format such that the image file is divided into a series of scans. The first scan shows the image at a lower quality, and the following scans gradually improve the image quality. For example, an image in progressive JPEG format is compressed in multiple passes of progressively higher detail. The initial passes include lower frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the startup time experienced by the end-user. Nonetheless, upon a GET request for an image, the entirety of the image is downloaded. In some instances, components of the webpage other than the image may have higher priority than the details of the progressively encoded image contained in the subsequent passes, and it would be advantageous to download these important components of the web page before the whole image. In some instances, it is preferable to deploy the bandwidth used to download the whole image than to instead download other important components of the webpage. However, such prioritization of webpage content is lost when the image is treated as a single binary content.

Therefore, in some embodiments, the startup wait time can be reduced by dividing a progressive JPEG image file (or other image files that are compressed in multiple passes of progressively higher detail) into a plurality of segments based on priorities, e.g., frequency. Having control of both ends of the communication in a client and server system, the lower frequency components of the image can be requested by client 406 and sent by edge server 408 first, and then the higher frequency components can be requested by client 406 and sent by server 408 dynamically to refresh and sharpen the image.

Since a webpage may include content retrieved by multiple GET requests, by dividing each GET request into a plurality of GET requests, the server transmit queue is reprioritized to transmit (and web browser 402 is reprioritized to render) the higher priority components of each of the GETs first. In particular, if one original GET request corresponds to a huge image, the impact of the huge image blocking all the other GET requests would be lessened. As a result, the latency of seeing the images from the other GET requests is reduced. The latency may be further reduced by obtaining the image components from one or more servers dynamically, the servers determined to be the most efficient/fastest using a content location address redirection at a user client that is already aware of the location address redirection mapping when the webpage is initially received.

In some embodiments, the segment sizes (e.g., the percentages of the original image file) delivered to web browser 402 in response to the plurality of GET requests may be tuned dynamically based on network load, network bandwidth, or other specifics of a user's connection. For example, the size of the first segment may be only 10% of the total image on a high latency and low bandwidth connection, while the size of the first segment may be 90% of the total image on a low latency and high bandwidth connection.

Figure 5:
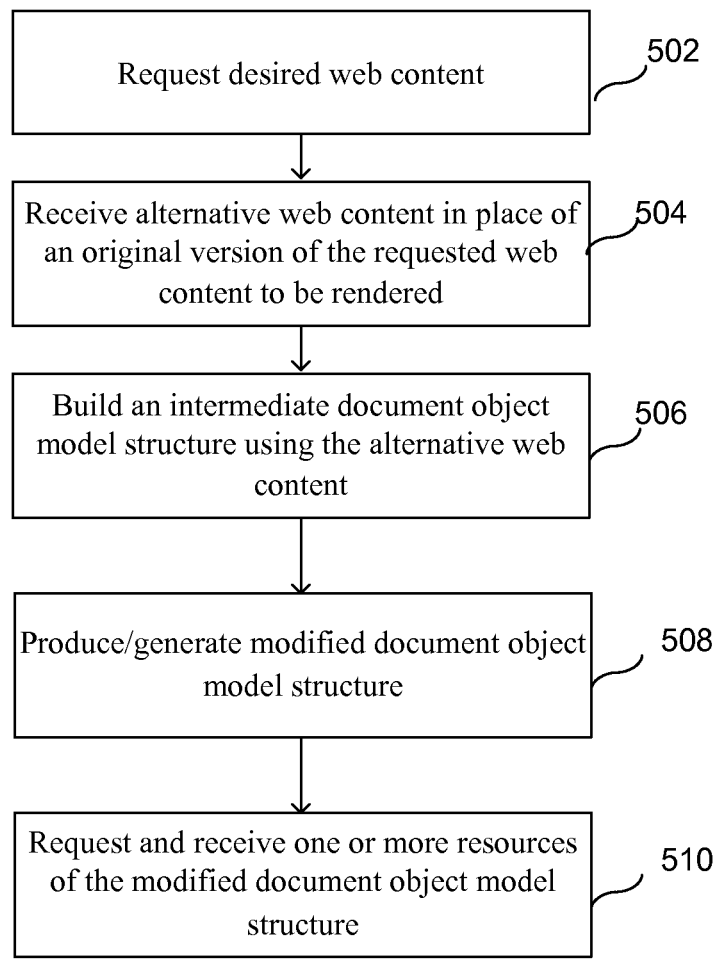
FIG. 5 is a flowchart illustrating an embodiment of a process for generating a modified document object model.

FIG. 5 is a flowchart illustrating an embodiment of a process for generating a modified document object model. The process of FIG. 5 may be implemented on client device 401, virtualization client 406, and/or web browser 402 of FIG. 4.

At 502, desired web content is requested. For example, a desired webpage is requested. In some embodiments, requesting the web content includes sending an HTTP request message to a server. Examples of the web content include a webpage, a streaming content, a web application, a web resource, a resource of a webpage, and any other content accessible via the Internet. For example, to display a web content (e.g., webpage 200 as shown in FIG. 2), web browser 402 sends an HTTP request message to a server (e.g., edge server 408 or content provider 412) requesting the HTML webpage file corresponding to the webpage. In some embodiments, the request includes an identifier of the requested content that is resolved to another identifier. For example, the request includes a URL (e.g., received from a user that types the URL or selects a link of the URL) and at least a portion of the URL is provided to a DNS server to translate at least a portion of the URL to an IP address to be utilized to request the web content. In some embodiments, the destination of the request is adjusted dynamically using the DNS server. For example, mapping between a domain of a URL of the request and an associated IP address may be modified to modify a destination of the request. In some embodiments, the requested web content is requested by an Adobe Flash application. In some embodiments, the requested web content is requested by a mobile application such as an Apple iOS application or a Google Android application.

At 504, alternative web content is received in place of an original version of the requested web content to be rendered. For example, the alternative web content is placeholder content that includes code for a virtualization client (e.g., virtualization client 406 of FIG. 4). In this example, by providing the virtualization client instead of the original requested web content, it enables the virtualization client to be implemented at a client device to subsequently request, intercept and process the original requested web content to be rendered for optimizations before allowing the original requested web content to be rendered by a web browser. For example, in a traditional web content request response, the original requested web content to be rendered would be provided (e.g., obtained from origin server or an edge server that cached the original requested web content) in response to the initial request in 502. However, by providing the alternative web content that will subsequently request the original version instead, a virtualization layer may be enabled in between a web browser and the original requested web content to enable optimizations.

In some embodiments, the received alternative web content includes a virtualization client such as virtualization client 406. For example, code for virtualization client 406 of FIG. 4 is inserted into a webpage file. In some embodiments, this webpage file is a placeholder webpage that does not include contents of the original requested webpage. In some embodiments, the webpage file includes a portion of the original requested webpage but not the entire contents of the original requested webpage file. The virtualization client may be coded in a managed programming language (e.g., runs in a Common Language Runtime) and/or a web programming/scripting language such as JavaScript, Java, .Net, etc. In some embodiments, the virtualization client may be injected by adding JavaScript client code in the head section of an HTML webpage file included in the alternative web content. In some embodiments, the received alternative web content is received from edge server 408. In some embodiments, the received alternative web content is received directly from content provider 412.

In some embodiments, alternative web content includes an identification of the original requested web content to be rendered. In some embodiments, a location address where the original requested web content (e.g., URI where the actual original requested web content is located) is to be obtained is specified in the alternative web content. For example, rather than publishing web content to be accessible for rendering at a public location address to be utilized by a user to access the published web content, a content publisher publishes the web content at a different location address that will be instead accessed by a virtualization client included in the alternative content provided at the public location address of the original web content.

At 506, an intermediate document object model (DOM) structure is built using the alternative web content. In some embodiments, building the intermediate document object model structure includes allowing a web browser (e.g., web browser 402 of FIG. 2) to receive and process the alternative web content received at 504. For example, the web browser builds a document object model tree of an alternative webpage received at 504. Building the intermediate document object model structure may include executing program code implementing a virtualization client (e.g., virtualization client 406 of FIG. 4) included in the received alternative web content. In some embodiments, building the intermediate document object model structure includes inserting objects in the intermediate document model structure of content included in the alternative web content. For example, the alternative web content includes a portion of original requested web content to be rendered, and objects corresponding to the included original requested web content portions are inserted in the intermediate document object model structure.

At 508, modified document object model structure is produced/generated. For example, the virtualization client included in the alternative web content modifies the intermediate document object model structure with data of the original requested web content to create a modified document object model structure. In some embodiments, generating the modified document object model structure includes requesting and receiving the original requested web content. For example, a virtualization client included in the received alternative content that was received in place of the original requested web content requests and receives the original requested web content to be rendered using an alternate location address where the original requested web content can be obtained. In some embodiments, a portion of the original requested web content was included in the received alternative content and a remaining portion of the original requested web content is requested by the virtualization client. In some embodiments, generating the modified document object model structure includes modifying the requested and received original requested web content. For example, location addresses specified in the original requested web content are modified. In another example, the original requested web content is modified for more optimized content delivery and/or rendering. In some embodiments, generating the modified document object model structure includes placing objects of the original requested web content in the intermediate document object model structure. For example, a virtualization client modifies the intermediate document model structure to include objects of the original requested web content to render the original requested web content.

In some embodiments, generating the modified document object model structure includes modifying an original document object model structure corresponding to the original version of the desired web content. For example, objects of the original document object model structure are modified to generate the modified document object model structure. In some embodiments, generating the modified document object model structure includes placing objects of a modified version of the original requested web content in the intermediate document object model structure. The virtualization client may also manipulate the document object model tree of a web browser by making the appropriate method API calls to the DOM tree. As a result, the virtualization client may manipulate a DOM tree, including the creation, deletion, or update of nodes within the DOM tree. In some embodiments, generating the modified document object model structure includes modifying objects of the original requested web content before placing the modified objects in the intermediate document object model.

In various embodiments, by producing the modified document object model structure different from an original document object model structure corresponding to the original version of the desired web content, various types of different types of optimizations may be achieved. In some embodiments, content redirection can be achieved by replacing a location address of a webpage resource with another location address that is able to provide the resource faster. In some embodiments, optimized delivery of information over a network by segmentation and reprioritization of downloaded information can be achieved. For example, the delivery of the information (e.g., the order in which the information is delivered or the granularity of the information delivered) and the actual content of the delivered information corresponding to any nodes of the DOM tree may be altered, thereby speeding up the rendering of a webpage without compromising the end-user's experience.

In various embodiments, generating the modified document object model structure includes modifying the intermediate document object model structure (e.g., selecting a modification to be performed) based on a property of a client system (e.g., detected property) that is to render the original requested web content. For example, the optimizations of the original requested web content performed by the virtualization client takes into consideration a property of the client system. For the same original requested web content, this may allow one type of optimization to be performed for one type of user system while allowing a different optimization to be performed for another type of user system. Examples of the property of the client system include the following: a type of web browser, a web browser version, available plugin/extensions of a web browser, a java processing software version, a type of operation system, a type of network connection, a network connection speed, a display property, a display type, a display window property, a type of user device, resources of a user system, or a system property of a user system.

In some embodiments, mapping data that is utilized by a virtualization client to modify the intermediate document object model structure is received. For example, the mapping data is utilized by the virtualization client to replace a content location address of a webpage resource to another address specified by the mapping data. The mapping data may include a data structure (e.g., a table, a database, a chart, a hash table, a list, a spreadsheet, etc.). In some embodiments, the received mapping data is encoded in HTML (e.g., encoded using HTML tags). In some embodiments, the received mapping data is encoded in JavaScript Object Notation. In some embodiments, by utilizing the mapping data, one or more content location addresses of the original requested web content may be dynamically modified. By modifying the content location address, referenced content may be replaced with different/modified content and/or provided from a different location. The received mapping data may include one or more entries mapping an initial location address to a translated location address. For example, a mapping data entry maps an initial URI/URL to a translated URI/URL. In another example, a mapping data entry maps an initial URI/URL to a location address that includes an IP address. The mapping data corresponds to the received original requested web content. For example, the received mapping data includes one or more entries that correspond to one or more location addresses referenced by the original requested web content. The mapping data may include an entry that maps a location address of a resource request to a translated location address. The initial location address of the original requested web content to be translated using the mapping data may be a dynamically generated location address. For example, the initial location address was generated from execution of a web application (e.g., programmed using a web programming language) of the received original requested web content.

In some embodiments, a location address of a network resource is used to search a data structure that includes the received mapping data. If an entry that matches the location address of the network resource is found, the location address of the network resource is modified using a corresponding translated location address specified by the matching entry. For example, the entry maps an initial URI/URL to a translated URI/URL and the matching initial URI/URL of the network resource is replaced with the translated URI/URL. In another example, a mapping data entry maps an initial URL to a location address that includes an IP address. If a matching entry is not found in the data structure, the initial location address without replacement or translation may be utilized. In some embodiments, if a matching entry is not found in the data structure, the initial location address is modified using a standard default translation. For example, a default translation policy specifies at least a portion of a location address (e.g., domain of the URI) to be replaced with another identifier.

In some embodiments, the mapping data is received together with the alternative web content as a single received content (e.g., specified in the alternative web content). In some embodiments, the alternative web content and the mapping data are received from the same server. In some embodiments, the mapping data is received together with the original requested web content. In some embodiments, the mapping data is received separately from the alternative web content and the original requested web content. For example, a virtualization client included in the web content requests/receives the mapping data in a separate request.

At 510, one or more resources of the modified document object model structure are requested and received. For example, a web browser traverses the modified DOM tree to retrieve any dependent resources (e.g., images, scripts, video, etc. to be obtained via a network to render a webpage) indicated by any of the nodes in the DOM tree via a network. In one example, the image object corresponding to the static image tag in webpage 200 redirects web browser 402 to fetch an image file from a URL. The received resources may be utilized to populate the modified DOM and/or provide/render content to a user. In some embodiments, the request for the one or more resources are requested using corresponding network location addresses that have been modified/translated when modifying the intermediate DOM in 508. In some embodiments, requesting one or more resources includes intercepting a request for a resource. For example, a virtualization client such as virtualization client 406 intercepts requests for one or more resources of the web content before the request is made via the network.

A location address of the intercepted request may be replaced with a translated location address determined using the received mapping data. By using the translated location address, an initially referenced content may be replaced with a different/modified content and/or requested using a different server. In some embodiments, an inline code inserted in the received web content is utilized to intercept the request and/or replace the intercepted request with a translated location. In some embodiments, a programming language/script file inserted/referenced in the received web content (e.g., and provided with the received web content) is utilized to intercept the request and/or replace the intercepted request with a translated location. In some embodiments, a programming language/script code to be utilized to intercept the request and/or replace the intercepted request with a translated location is requested (e.g., requested using Ajax call or XMLHttpRequest call to a server such as edge server 408 of FIG. 4) and received. The received code may be encoded in a type of programming language/script based at least in part on a programming language/script that is to utilize the translated location. For example, the code to be utilized to intercept the request and/or replace the intercepted request with a translated location is encoded in a programming language/script that matches the programming language/script that will be using the translated location (e.g., JavaScript code provided for JavaScript application to utilize the translated location, ActionScript code provided for Flash application to utilize the translated location, native iOS code provided to an iOS application to utilize the translated location, etc.).

In some embodiments, once the location address of a resource has been analyzed and replaced with a translated location, if appropriate, the resource is requested via the network. Requesting the resource via the network may include further translating at least a portion of the translated location address using a name server (e.g., DNS server) to translate a domain name of the location address to an IP address.

In some embodiments, in response to a network resource request, an updated mapping data is received in addition to the requested resource content. For example, data updating the previously received mapping data is received along with the requested resource content if the mapping data is to be updated. In some embodiments, the updated mapping data includes a new mapping data to replace the entire previously received mapping data. For example, virtualization client 406 replaces a stored version of the previously received mapping data with the updated mapping data. In some embodiments, the updated mapping data includes only the data required to partially update the previously received mapping data. For example, virtualization client 406 utilizes the received update to modify a portion of the previously received mapping data.

The updated mapping data may be received from the same server as the server that provided the requested resource. In some embodiments, the updated mapping data is provided by a different server from the server that provided the requested resource content. The requested resource and the updated mapping data may be received together as a signal data package or may be received separately. In some embodiments, the updated mapping data is received as needed without necessarily being received in response to a resource request. For example, a virtualization client such as client 406 of FIG. 4 periodically polls a server (e.g., edge server 408 of FIG. 4) for any update to the mapping data. In another example, updates to the mapping data are dynamically provided/pushed to the virtualization client as needed.

Figure 6:
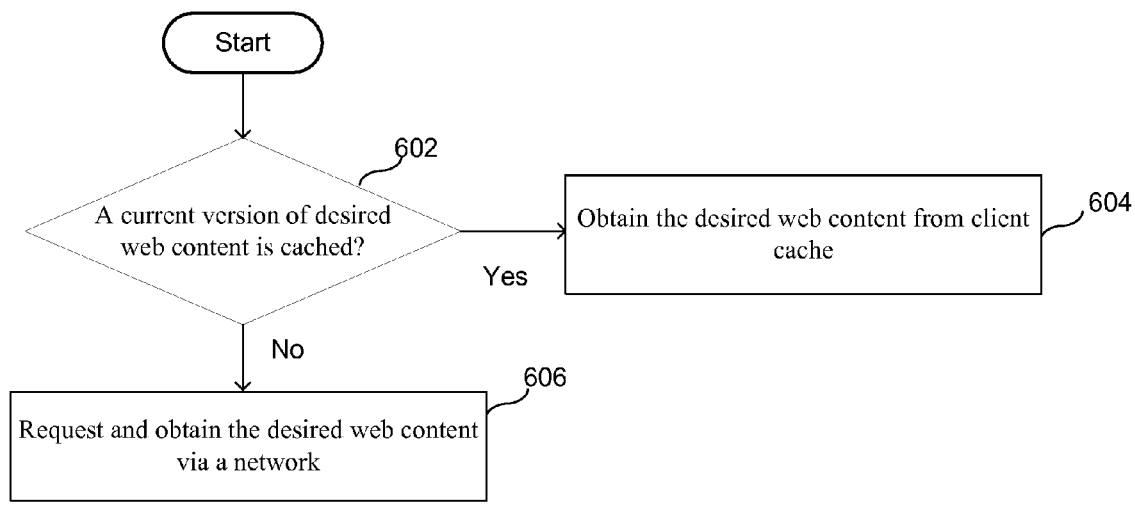
FIG. 6 is a flowchart illustrating an embodiment of a process for whether dynamic web content has been cached.

FIG. 6 is a flowchart illustrating an embodiment of a process for whether dynamic web content has been cached. The process of FIG. 6 may be implemented on client device 401, virtualization client 406, and/or web browser 402 of FIG. 4. In some embodiments, at least a portion of the process of FIG. 6 is included in 508 of FIG. 5. For example, the process of FIG. 6 is utilized in 508 to determine whether the original requested content can be obtained from a cache rather than via a network. In some embodiments, at least a portion of the process of FIG. 6 is included in 510 of FIG. 5. For example, it is determined whether current versions of remote resources of a webpage to be rendered are cached.

At 602, it is determined whether a current version of desired web content is cached. For example, it is determined whether a requested webpage associated with the most current version (e.g., latest version) identifier has been cached in a client cache (e.g., cache of a user client system such as a web browser cache).

In some embodiments, the determination of whether the current version of the desired web content has been cached is determined in response to a request for the web content. For example, a user indicates via a web browser to obtain and render the requested web content and the web browser performs the determination in 602. In some embodiments, the determination of whether the current version of the desired web content has been cached is determined using a virtualization client. For example, a virtualization client included an alternative webpage received in 504 of FIG. 5 determines in 508 whether the current version of the original requested web content is stored in a web browser cache in producing the modified document object model structure. In some embodiments, the desired web content is a resource of a webpage. For example, the process of FIG. 6 is included in 510 of FIG. 5 and it is determined whether the most current version resource identified in a document object model has been cached in a web browser cache.

Because often dynamic web content such as a newsfeed webpage cannot be cached due to its changing nature, the dynamic web content is requested via a network rather than obtained from a cache. In some embodiments, web content is able to be cached at a cache (e.g., browser cache 410 of FIG. 4) by enabling identification of whether the most current version of the dynamic content is cached.

In some embodiments, an identifier of the most current version of the desired web content is received. For example, an alternative web content received in response to a request for the desired web content (e.g., received in 504 of FIG. 5) includes an identifier (e.g., version number) of the most current version of the desired web content. The alternative web content may also include one or more current version identifiers of web content resources of a desired webpage (e.g., specified in a table, data structure, database, etc. listing current version identifiers of all dependent resources utilized in the webpage). In some embodiments, the current version identifier of the desired web content is included in a received mapping data utilized to modify/redirect a URI/URL of a webpage resource. In some embodiments, the identifier of the most current version is received separately from the alternative web content and/or original requested web content. For example, the identifier of the most current version is stored at a remote server and the identifier is dynamically requested and received when the desired web content is requested.

In some embodiments, determining whether the current version of desired web content is cached includes generating a location identifier of the desired web content that identifies the current version of the desired web content. For example, a URI of the desired web content is appended with a query string that includes an identifier of the current version (e.g., URI "company.com/images/pic.jpg" modified to "company.com/images/pic.jpg?ver=11") or is otherwise modified using the identifier of the current version (e.g., URI "company.com/images/pic.jpg" modified to "company.com/images/pic_ver111.jpg"). The generated location identifier may be utilized to search a cache to determine whether web content with the generated location identifier has been cached. For example, because each different version of web content has been cached under a different generated location identifier, a web browser is able to determine whether the specific version has been cached in the web browser cache by locating cached content with the generated location identifier that specifies the desired version. In some embodiments, each cached content is associated with a version identifier (e.g., specified within the web browser cache, at a separate data structure, etc.) and the version identifier is compared with an identifier of the current version to determine whether the cached content is the current version. In some embodiments, because different versions of cache content can be identified, the cached content is associated with a long or infinite cache TTL.

If at 602 it is determined that the current version of the desired web content has been cached, at 604 the desired web content is obtained from the client cache. For example, it is determined that a version number associated with a cached version of the desired web content matches a desired version number, and the cached version of the desired web content is obtained from a web browser cache for use. This may allow the desired web content to be not needed to be requested via a network. The obtained web content from the cache may be utilized in 508 of FIG. 5 to modify an intermediate document object model to generate/produce the modified document object model. In some embodiments, the obtained web content from the cache is utilized to render the desired web content. In some embodiments, the cached version of the desired web content is a modified version of the desired web content. For example, the desired web content has been modified to optimize performance and/or rendering (e.g., resource location addresses modified) before being cached. In some embodiments, the desired web content has been modified in 508 of FIG. 5 before being cached. In some embodiments, the obtained web content is placed in a document object model to render a webpage.

If at 602 it is determined that the current version of the desired web content has not been cached, at 606 the desired web content is requested and obtained via a network. For example, it is determined that a version number associated with a cached version of the desired web content does not match a desired version number, and the desired web content is requested (e.g., requested by the virtualization client 406 of FIG. 4) and received. The obtained web content from the network may be utilized in 508 of FIG. 5 to modify an intermediate document object model to generate the modified document object model. In some embodiments, the web content obtained via the network is cached in a client system cache (e.g., cached in web browser cache and associated with an identifier of the current version by modifying a location address associated with the cached content). The cached version of the desired web content may be a modified version of the desired web content (e.g., modified in 508 of FIG. 5). The obtained web content may be provided to a web browser for rendering. In some embodiments, if it is determined a previous version of the desired web content has been cached (e.g., version number of the cached version is before the version number of the current version), the previous version is purged from the cache. In some embodiments, the obtained web content is placed in a document object model to render a webpage (e.g., the web content is obtained in 510 of FIG. 5).

Figure 7:
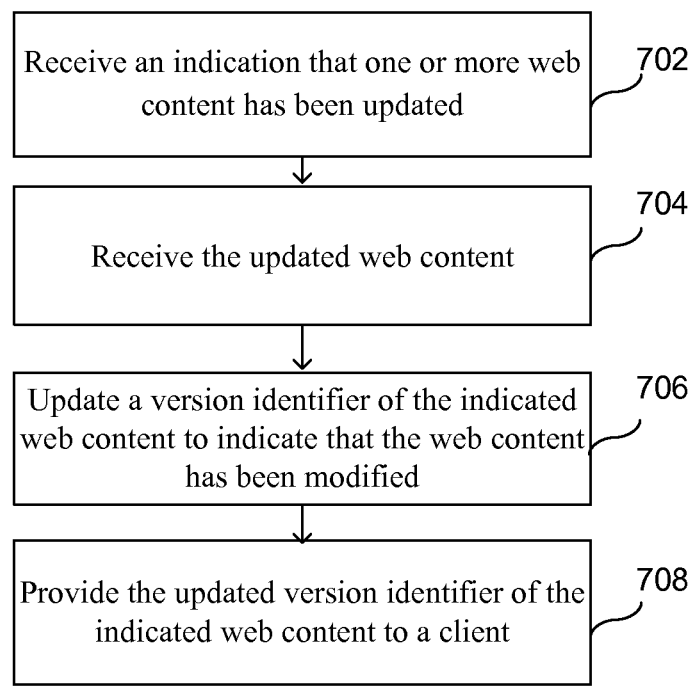
FIG. 7 is a flowchart illustrating an embodiment of a process for updating a web content version identifier.

FIG. 7 is a flowchart illustrating an embodiment of a process for updating a web content version identifier. The process of FIG. 7 may be implemented on edge server 408 and/or content provider 412 of FIG. 4. In some embodiments, the process of FIG. 7 is implemented on an origin server, an edge server, a proxy server, a mirroring server, and/or other networked servers configured to provide web content.

At 702, an indication that one or more web content has been updated is received. For example, an edge server or a server of a content delivery network receives an indication that content to be served by the server has been updated. The indication may be dynamically and/or periodically provided by an origin server (e.g., origin server provides the indication via an API provided by an entity of the receiving server) such as server 412 of FIG. 4. In some embodiments, the indication is automatically determined. For example, a module of an edge server determines that a content to be served by the edge server has been updated (e.g., by comparing a timestamp associated with the current version of content with a timestamp associated with the previous version of content) and provides an indication to another module of the edge server. The edge server may dynamically (e.g., when associated webpage of the content is requested) and/or periodically check to determine whether content to be served has been updated. In various embodiments, it is determined that web content has been updated by comparing a size, metadata, timestamp, version number, version identifier, and included contents of the web content with a reference data (e.g., corresponding information about a previous version of the web content).

At 704, the updated web content is received. For example, the web content indicated to be updated is requested and received from an origin server. In an alternative embodiment, the updated web content is not requested and received. The updated web content may be stored in a server cache such as a cache of an edge server.

At 706, a version identifier of the indicated web content is updated to indicate that the web content has been modified. For example, an entry corresponding to the indicated web content in a data structure (e.g., list, table, database, etc.) of current version identifiers of web content is updated. In some embodiments, updating the version identifier includes incrementing a version number associated with the indicated web content. In some embodiments, updating the version identifier includes updating stored information indicating the latest version of the indicated web content. For example, information such as a creation timestamp, a modification timestamp, a file size, metadata, a hash value (e.g., generated by using a hash function to hash the latest version of the indicated web content), and/or any other information about the indicated content is stored to be able to identify whether the indicated content has been modified. The version identifier may be saved at an origin server, an edge server, a proxy server, a mirroring server, a client, and/or other networked server configured to provide the version identifiers of the current versions of web contents.

At 708, the updated version identifier of the indicated web content is provided to a client. The receiving client may be a virtualization client (e.g., virtualization client 406 of FIG. 4). In some embodiments, the updated version identifier is provided to a web browser. In some embodiments, the updated version identifier is provided to the client when the client requests the indicated web content and/or requests an associated web content that references the indicated web content (e.g., webpage references indicated web content resource). For example, the updated version identifier is provided in and/or with the alternative web content provided in 504 of FIG. 5 to indicate the most current version of the requested original web content. This updated version identifier may be utilized in 602 to determine whether the current version of the indicated web content has been cached by a client.

In some embodiments, the updated version identifier is provided in a listing of current version identifiers of resources of a webpage. For example, in response to a request for the webpage, the listing of current version identifiers of web resources referenced in the webpage is provided (e.g., provided in/with the alternative web content provided in 504 of FIG. 5 and/or provided in/with original requested web content received in 508 of FIG. 5 in producing the modified document object model structure). These updated version identifiers may be utilized in 508 of FIG. 5 to modify location identifiers of the resource in the modified document object model.

In some embodiments, the updated version identifier is provided dynamically to a network client that is known to be caching the indicated web content. For example, a server provides an indication to the network client (e.g., client device 401 of FIG. 4) that is known to be caching a previous version of the indicated content and/or utilizing/caching a webpage referencing the indicated content. This may allow the network client to update a version identifier identifying the latest version of the indicated content and/or purge a previous version of the indicated content from its cache.

Figure 8:
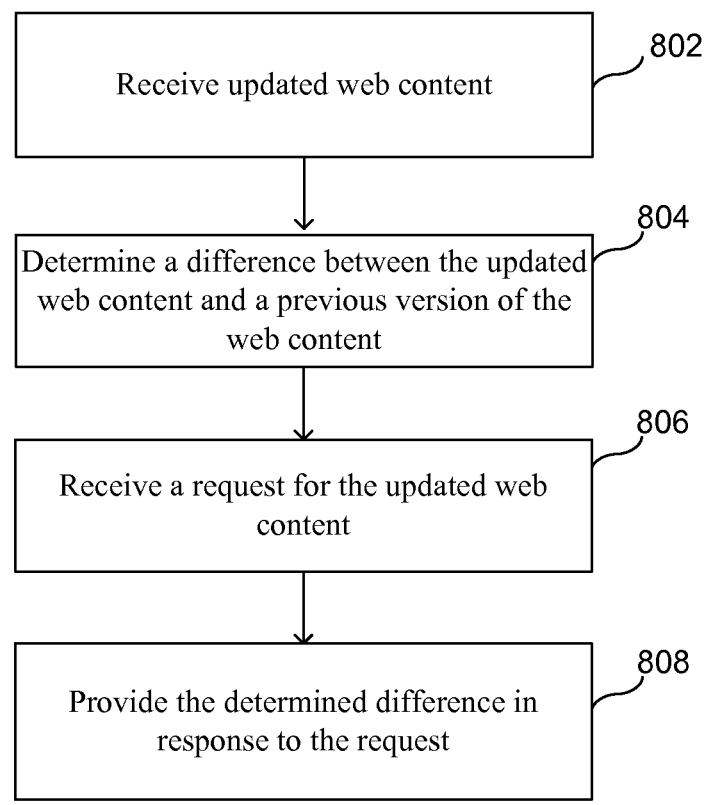
FIG. 8 is a flowchart illustrating an embodiment of a process for determining a difference between an updated version of web content and a previous version of the web content.

FIG. 8 is a flowchart illustrating an embodiment of a process for determining a difference between an updated version of web content and a previous version of the web content. The process of FIG. 8 may be implemented on edge server 408 and/or content provider 412 of FIG. 4. In some embodiments, the process of FIG. 8 is implemented on an origin server, an edge server, a proxy server, a mirroring server, and/or other networked server configured to provide web content.

At 802, updated web content is received. In some embodiments, the updated web content is an updated version of a previous version of the web content. For example, an edge server and/or an origin server determines that content to be served has been updated and obtains the updated content. In some embodiments, the updated web content is received at an edge server (e.g., server 104 of FIG. 4) from an origin server (e.g., content provider 412 of FIG. 4). In some embodiments, the updated web content is contented indicated to be updated in 702 of FIG. 7. In some embodiments, the updated web content is received in 704 of FIG. 7. The receiving the updated web content may include receiving a new file including the updated web content. For example, a webpage has been updated and the entire updated webpage file is received. In some embodiments, the updated web content is received from a content creator at an origin server that will be serving the updated web content to another server and/or a user system.

At 804, a difference between the updated web content and a previous version of the web content is determined. For example, traditionally when updating a cache, an old version of an updated content file is replaced in its entirety with the updated version of the content file. However when content is updated, often only a portion of the dynamic content is modified from a previous version of the content. Rather than replacing the entire content (e.g., replacing the entire file content including unmodified portions of the content) with an updated version of the content, only a portion of the content that has been updated may be replaced to save network bandwidth and improve loading speed.

In some embodiments, determining the difference (e.g., content difference) includes identifying content that has been added, removed, or modified from the previous version of the web content to the updated web content. In some embodiments, determining the difference includes determining one or more transformations/updates that can be applied to the previous version of the web content to generate the updated version of the web content. For example, rather than providing the entire updated web content, a smaller sized determined difference update may be provided to allow a virtualization client to patch/update a previous version to generate the latest updated version. In some embodiments, determining the difference includes adding the updated version of the web content in a version control system. The previous version of the web content may be obtained from a cache. For example, the web content is obtained from a cache of an edge server that the edge server utilizes to provide content to requesting clients. In some embodiments, the previous version of the web content is obtained from an origin server or another content repository server. The previous version of the web content may have been locally stored in a local storage and/or local cache of the update content recipient.

At 806, a request for the updated web content is received. For example, a web browser requests web content from an edge server. In some embodiments, the request is received from a virtualization client such as client 406 of FIG. 4. For example, the request is received from a requestor that will process an update to the web content before providing the updated web content for rendering. In some embodiments, receiving the request includes receiving the request for content received in 508 of FIG. 5 (e.g., content received in producing the modified document object model structure), 606 of FIG. 6, and/or 704 of FIG. 7. For example, the requestor of the updated web content is aware that the web content has been since updated from a version of the web content cached/stored by the requestor. In some embodiments, the request is for an updated webpage. In some embodiments, the request is for an updated resource of a webpage. In some embodiments, the request indicates whether a previous version of the web content has been stored/cached by the requestor. The request may also indicate which previous version (e.g., version number) of the web content has been cached by the requestor.

At 808, the determined difference is provided in response to the request. For example, the determined difference between the updated web content and the previous version of the web content cached/stored by the determined difference recipient is provided to allow the recipient (e.g., virtualization client 406 of FIG. 4) of the determined difference to patch/update the previous version to generate the latest updated version rather than directly providing the updated version. This may allow a portion of the latest updated version to be provided via a network rather than the entire version (e.g., entire updated web content file), allowing bandwidth savings and reduction in time required to obtain the latest updated version. In some embodiments, a plurality of determined differences may be provided. For example, if a recipient of the determined differences has cached a previous version of the web content that since has been updated a plurality of times, a plurality of determined differences to be applied (e.g., to be applied in specified order to generate intermediate updated web content) to generate the latest updated web content is provided.

In some embodiments, the entire updated web content (e.g., entire web content file) rather than the determined difference is provided if the recipient has not currently cached/stored a previous version of the web content. In some embodiments, the entire updated web content rather than the determined difference is provided if the recipient has not currently cached/stored at least one of one or more specified previous versions of the web content. In some embodiments, the entire updated web content rather than the determined difference is provided if the change between the updated web content and the previous version of the web content cached/stored by the recipient is greater than a threshold. For example, if a large amount of update has occurred to the web content, it may be more efficient to download the entire updated web content rather than consuming processing resources to patch/update a large amount of data. In some embodiments, the provided determined difference indicates that the provided determined difference is the entire latest updated version to replace the previous version of the web content rather than replacing a portion of the previous version of the web content.

Figure 9:
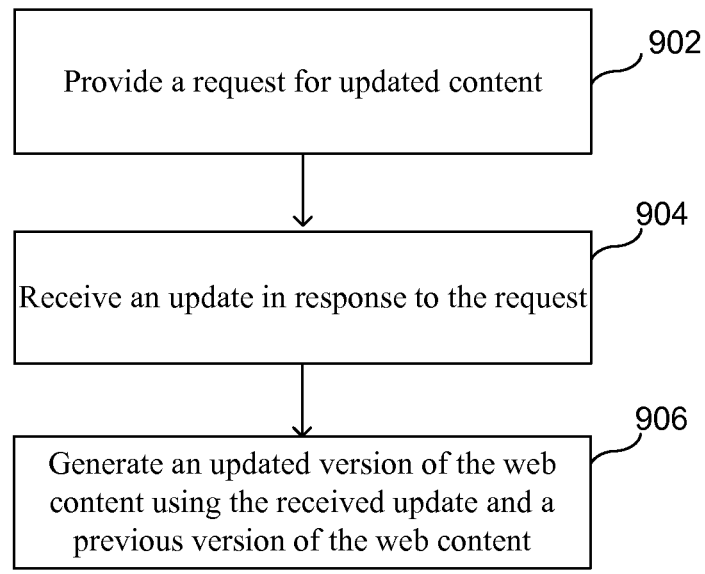
FIG. 9 is a flowchart illustrating an embodiment of a process for generating an updated version of web content and a previous version of the web content.

FIG. 9 is a flowchart illustrating an embodiment of a process for generating an updated version of web content and a previous version of the web content. The process of FIG. 9 may be implemented on client system 401 of FIG. 4. For example, at least a portion of the process of FIG. 9 is implemented on virtualization client 406 of FIG. 4.

At 902, a request for updated content is provided. For example, in 602 of FIG. 6 it is determined that a current version of the desired web content has not been cached but a previous version of the desired web content has been cached, and at 606, updated web content is requested. In some embodiments, the request in 902 is included in the request received in 806 of FIG. 8. In some embodiments, the request indicates whether and/or which previous version of the web content has been stored/cached by the requestor.

At 904, an update is received in response to the request. For example, the determined difference provided in 808 is received in 904. The update may include a portion of the requested updated content that can be used to update a previous version of the web content to generate the web content. For example, rather than receiving the entire updated web content file, a smaller sized difference update is received to allow patching/updating of the previous version to generate the latest updated version. In some embodiments, the update includes a plurality of updates to be applied to a previous version of the web content. In some embodiments, the received update is the entire updated web content (e.g., entire web content file) rather than the determined difference and the received entire updated web content is utilized/cached (e.g., may replace a previous cached version) and the process ends.

At 906, an updated version of the web content is generated using the received update and a previous version of the web content. For example, the update provides instructions (e.g., transformations) on how to update the previous version to generate the latest updated versions and the update is applied to generate the updated version of the web content. In some embodiments, the previous version of the web content is obtained from a cache such as cache 410 of FIG. 4, and the previous version is patched/updated as instructed by the received update to generate the update version of the web content. The generated updated version may be cached, stored, rendered, placed in a document object model structure, provided to a web browser, and/or otherwise utilized.

Figure 10:
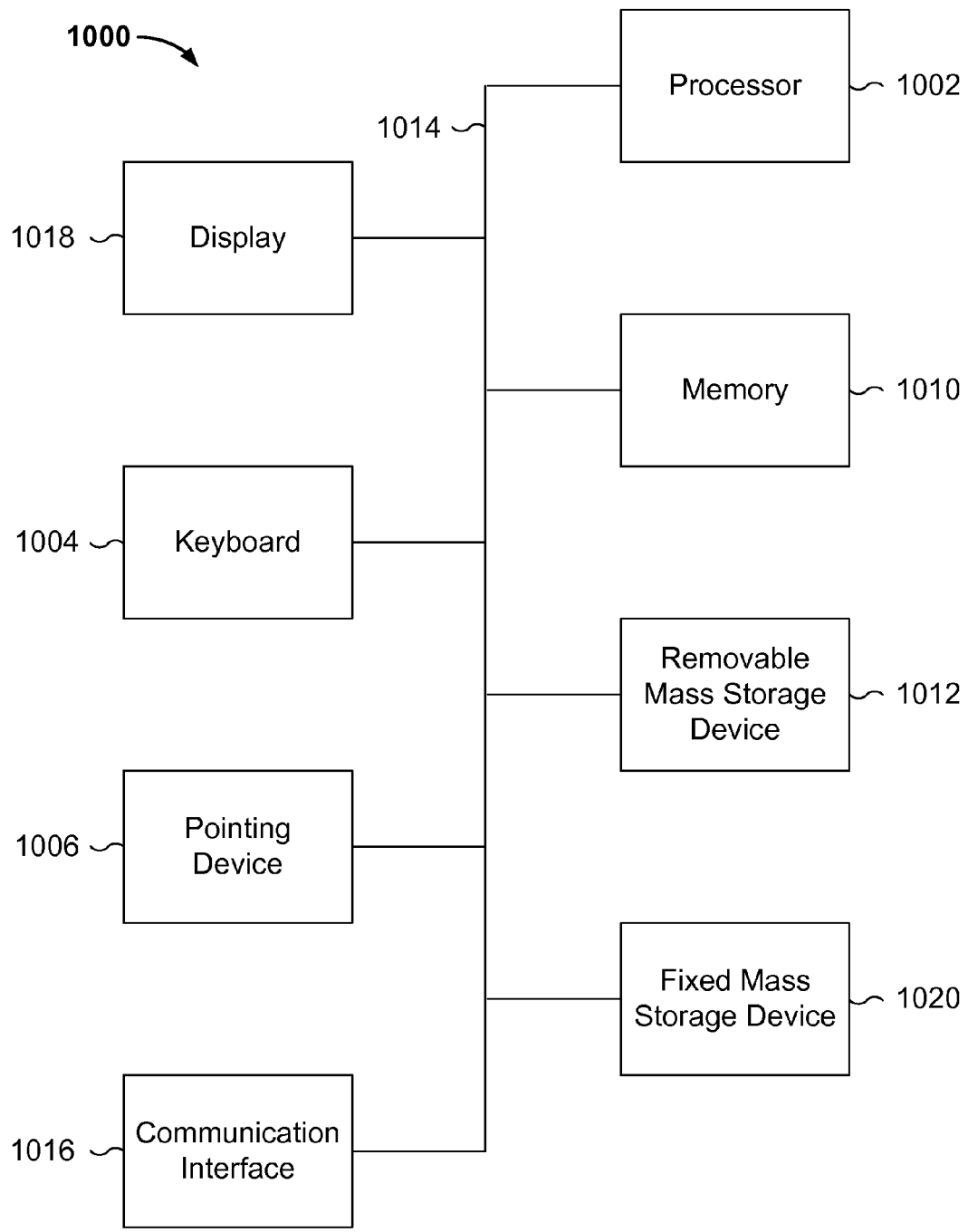
FIG. 10 is a functional diagram illustrating a programmed computer system in accordance with some embodiments described previously.

FIG. 10 is a functional diagram illustrating a programmed computer system in accordance with some embodiments described previously. Computer system 1000 may be included in client system 401, edge server 408, and/or content provider 412 of FIG. 4. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018). In some embodiments, system 1000 includes multiple processors 1002.

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer-readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or uni-directionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storage 1012, 1020 generally store additional programming instructions, data, and the like that typically are not in active use by the processor 1002. It will be appreciated that the information retained within mass storage 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a communication interface (also referred to as a network interface) 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The communication interface 1016 allows processor 1002 to be coupled to another computer, computer network, or telecommunications network using a network connection as shown. For example, through the communication interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through communication interface 1016. Examples of a communication interface include without limitation external connections, such as a port, cable, wireline or wireless network interface card, etc., and internal connections such as a communication bus.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1000 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A web server system for tracking web content updates, comprising:
a processor configured to:
receive an indication that a web content has been updated; and
track that the web content has been updated, wherein tracking that the web content has been updated includes updating a version identifier of the web content; and
a communication interface coupled with the processor and configured to:
provide via a network an update that includes the version identifier without the web content to a client, wherein the client utilizes the version identifier to determine whether a version of the web content stored in a web browser cache of the client is no longer valid without receiving a latest version of the web content; and
receive via the network a request for an updated version of the web content from the client in response to a determination made by the client using the version identifier;
wherein the web content includes a resource of a webpage and the version identifier included in the update is utilized by the client of the web server system to modify a location identifier of the resource in a document object model of the webpage and the client modified the location identifier at least in part by replacing the location identifier originally specified in the webpage with a replacement identifier of the resource in the document object model of the webpage.

2. The system of claim 1, wherein the modification of the location identifier of the resource in the document object model was performed using code included in an alternative version of the webpage received by the client in response to a request for the webpage.

3. The system of claim 1, wherein the system is a part of a content delivery network.

4. The system of claim 1, wherein the system is an edge server of a content delivery network.

5. The system of claim 1, wherein the system further comprises a cache that stores the web content for delivery to a requesting client.

6. The system of claim 1, wherein the indication that the web content has been updated is received from an origin server.

7. The system of claim 1, wherein the indication that the web content has been updated is received via an Application Programming Interface.

8. The system of claim 1, wherein the indication that the web content has been updated is received as at least a portion of a periodic update.

9. The system of claim 1, wherein the indication that the web content has been updated is received as at least a portion of a dynamic update.

10. The system of claim 1, wherein the indication that the web content has been updated is received in response to a network request sent by the system.

11. The system of claim 1, wherein the indication was determined by the system by comparing a property of an updated version of the web content with a corresponding property of a cached version of the web content.

12. The system of claim 1, wherein in response to the indication, the system requests and receives an updated version of the web content.

13. The system of claim 1, wherein the update is provided to the client in response to a request for the web content from the client.

14. The system of claim 1, wherein the update is provided to the client in response to a determination that the client is caching the web content.

15. The system of claim 1, wherein the client utilizes the version identifier of the web content included in the update to determine whether a most current version of the web content has been cached in the web browser cache of the client.

16. The system of claim 1, wherein the location address is associated with a cached version of the web content cached in the web browser cache.

17. The system of claim 1, wherein in response to the update, the client deletes a previous version of the web content cached in the web browser cache of the client.

18. A method for tracking web content updates, comprising:
- receiving an indication that a web content has been updated;
- using a processor of a web server to track that the web content has been updated, wherein tracking that the web content has been updated includes updating a version identifier of the web content; and
- providing via a network an update that includes the version identifier without the web content to a client, wherein the client utilizes the version identifier to determine whether a version of the web content stored in a web browser cache of the client is no longer valid without receiving a latest version of the web content; and
- receiving via the network a request for an updated version of the web content from the client in response to a determination made by the client using the version identifier;
- wherein the web content includes a resource of a webpage and the version identifier included in the update is utilized by the client of the web server system to modify a location identifier of the resource in a document object model of the webpage and the client modified the location identifier at least in part by replacing the location identifier originally specified in the webpage with a replacement identifier of the resource in the document object model of the webpage.

19. A computer program product for tracking web content updates, the computer program product being embodied in a non-transitory computer readable storage medium and comprising computer instructions for:
- receiving an indication that a web content has been updated;
- tracking at a web server that that the web content has been updated, wherein tracking that the web content has been updated includes updating a version identifier of the web content; and
- providing via a network an update that includes the version identifier without the web content to a client, wherein the client utilizes the version identifier to determine whether a version of the web content stored in a web browser cache of the client is no longer valid without receiving a latest version of the web content; and
- receiving via the network a request for an updated version of the web content from the client in response to a determination made by the client using the version identifier;
- wherein the web content includes a resource of a webpage and the version identifier included in the update is utilized by the client of the web server system to modify a location identifier of the resource in a document object model of the webpage and the client modified the location identifier at least in part by replacing the location identifier originally specified in the webpage with a replacement identifier of the resource in the document object model of the webpage.

20. The method of claim 19, wherein the location address is associated with a cached version of the web content cached in the web browser cache.

* * * * *